United States Patent
Bergling

[11] Patent Number: 6,161,852
[45] Date of Patent: Dec. 19, 2000

[54] SULKY

[76] Inventor: Tomas Bergling, Tegnérvägen 10, Gävle SE-802 67, Sweden

[21] Appl. No.: 09/194,469
[22] PCT Filed: Mar. 13, 1997
[86] PCT No.: PCT/SE97/00425
§ 371 Date: Nov. 30, 1998
§ 102(e) Date: Nov. 30, 1998
[87] PCT Pub. No.: WO97/46437
PCT Pub. Date: Dec. 11, 1997

[30] Foreign Application Priority Data

May 31, 1996 [SE] Sweden ................................. 9602130

[51] Int. Cl.$^7$ ........................................................ B62C 1/00
[52] U.S. Cl. ..................... 280/63; 280/292; 280/47.25; 280/47.131
[58] Field of Search ................................ 280/63, 65, 66, 280/67, 68, 69, 70, 71, 72, 73, 74, 75, 76, 77, 288.4, 1.5, 47.24, 292, 47.25, 47.131, 47.331; 296/77.1, 78.1

[56] References Cited

U.S. PATENT DOCUMENTS

| | | |
|---|---|---|
| D. 152,273 | 6/1949 | Leonard . |
| 272,397 | 2/1883 | Yeoman et al. ........................ 280/66 |
| 367,105 | 7/1887 | Howard .................................. 280/69 |
| 393,836 | 12/1888 | Kellogg .................................. 280/63 |
| 393,989 | 12/1888 | Leek ...................................... 280/71 |
| 432,595 | 12/1890 | Bradley .................................. 280/66 |
| 1,863,112 | 6/1932 | Hanan . |
| 3,549,165 | 12/1970 | Zuhlke et al. ......................... 280/76 |
| 4,848,780 | 7/1989 | Straub .................................. 280/1.5 |
| 5,062,652 | 11/1991 | Burke .................................... 280/64 |

FOREIGN PATENT DOCUMENTS

| | | |
|---|---|---|
| 2 302 898 | 10/1976 | France . |
| 2 722 160 | 1/1996 | France . |
| 5766 | 12/1883 | United Kingdom . |
| 4269 | 3/1886 | United Kingdom . |
| 8905748 | 6/1990 | WIPO ................................. 280/63 |

*Primary Examiner*—Brian L. Johnson
*Assistant Examiner*—Bryan Fischmann
*Attorney, Agent, or Firm*—Michaelson & Wallace; Peter L. Michaelson

[57] ABSTRACT

A sulky which is to be connected to and drawn by a horse. The sulky comprises a seat, and an arrangement that receives a driver in a sitting position with his(her) feet located at a substantially lower level than the seat. This arrangement has means which support at least the legs of the driver in this sitting position.

9 Claims, 3 Drawing Sheets

SULKY

FIELD OF THE INVENTION AND PRIOR ART

The present invention relates to a sulky, adapted to be connected to and drawn by a horse, which comprises an arrangement adapted to receive a driver in the sulky.

Such sulkies are used primarily for races, but they are also used for training horses. The sulkies presently used have an arrangement for receiving the driver sitting onto a seat part with the legs of the driver diverging outwardly to the region of a respective shaft through which the sulky is connected to the horse. The arrangement supports the feet of the driver close to the respective shaft. The legs of the driver have to be kept substantially straight in this sitting position. The reason for keeping the legs apart in this way is to bring the driver as close as possible behind the horse for reducing the air resistance otherwise experienced by the carriage.

However, this known sulky has a number of drawbacks. Firstly, the driving position to be assumed by the driver in the sulky is anatomically condemnable, since the substantially straight and diverging legs mean tensions in the muscles and loads primarily on the back of the driver, which easily results in all types of problems with the back of the driver, but also the legs and the knee joints are exerted in this driving position. The loads applied on the body of the driver will be especially high when driving on a ground being somewhat irregular, since the rest of the sulky is without resilient suspension and by that rigid.

Another drawback consists in that, should the horse drawing the sulky rear, the driver will fall off the sulky rearwardly and hit the ground by the seat or the back with a risk of very severe injuries with possible permanent physical disorders as a consequence thereof.

SUMMARY OF THE INVENTION

The object of the present invention is to provide a sulky of the type defined in the introduction, which to a large extent reduces the drawbacks mentioned above of known sulkies.

This object is according to the invention obtained by arranging a sulky to receive a driver in a sitting position with his (her) feet on a substantially lower level than the seat and providing means adapted to support at least the legs of the driver in this position.

A driver sitting in such a sulky will not receive any unacceptable loads upon his body any longer owing to the fact that the driver is sitting in a natural sitting position with the feet on a substantial lower level than the seat. Furthermore, in the case the horse drawing the sulky were to rear, the driver may land on the ground with his feet first, when lucky in a standing position, but in any case in a position resulting in a considerable reduction of a risk of severe body injuries of the driver. Another advantage of such a sulky is that it will get considerably easier for the driver to get on and off the sulky as a consequence of the position of the feet with respect to the seat.

"Sitting position" is here to be given a very broad meaning, and all types of positions between lying and standing, in which the thighs and the lower leg portions of the driver may have the most different inclinations are included, but in which at least a considerable part of the weight of the driver is transferred to the sulky through the seat or the seat and the thighs of the driver.

According to a preferred embodiment of the invention said means are adapted to support the legs of a driver and define a sitting position for the driver with substantially bent knees. Such a sitting position of the driver results in considerably lower loads on the body of the driver, especially on the rear sides of the thighs, the seat and the back, than in sulkies already known.

These means can comprise members having support surfaces adapted to form support for the front side of at least parts of the legs of the driver sitting in the sulky and form counter-surfaces so as to make it possible for the driver to strongly draw reins, attached to the horse, in a rearward direction. Furthermore, these support surfaces of said are adapted to support the front side of at least knee-near portions of the lower leg portions of a driver sitting in the sulky, and are substantially oriented in a direction rearwardly opposite to the running direction of the horse. In this way, the driver can assume a substantial normal sitting position with his (her) feet on a substantially lower level than the seat and at the same time be able to draw strongly in the reins, should this be required. Sometimes, i.e. when the horse is very keen to run, it is necessary to apply a drawing force in the reins such that the drawing force is applied through shafts through which the horse draws the sulky. For managing such a drawing force in sulkies already known the driver has been forced to nearly lie down straight rearwardly, which for natural reasons is an extremely dangerous position to have when falling off the sulky, for example as a consequence of the horse rearing.

Alternatively, the means comprise support members adapted to form support for defining a sitting position of the driver with the lower leg portions extending from the knees rearwardly with respect to the running direction of the horse and at a substantial angle with respect to a vertical line through each respective knee. Owing to the fact that the support members form support for defining such a sitting position of the driver, it will be possible for the driver to come very close to the horse without the legs of the driver hitting against the hind legs of the horse, even if the driver has his legs relatively close together. As such, the driver may come substantially just as close to the horse in this sitting position as in the conventional sitting position with diverging legs. The sitting position enabled by this embodiment of the invention, i. e. with the legs comparatively close together and substantially just as close to the horse as previously, will result in a considerable reduction of the part of the air resistance of the carriage emanating from the driver. Since a horse may obtain speeds in the order of 50 km/h without any problem, it may be easily understood that this possible sitting position may result in a clear gain of time with respect to a conventional sitting position. In that regard, if it is only a question of gaining one second or a distance of 1,000 meters, which most probably may be achieved, such a gain would often decide whether a horse will win or come in second in a race and will therefor have a very great economical importance.

The support members are adapted to form support for defining a sitting position of the driver with the feet of the driver located substantially directly under the seat of the driver. A sitting position in which the driver may huddle together close behind the horse with a very low air resistance may in this way be assumed.

Here, the support members comprise elements adapted to receive the feet of a driver sitting in the sulky and keep them in a defined position. It has been found to be advantageous to arrange a so called foot rest so as to keep the lower leg portions in the preferred position, since this has been experienced as comfortable for the driver.

Here, the sulky comprises members adapted to arrange these elements such that the drive can remove his (her) feet to perform in a rearwardly direction while overcoming a resistance associated with doing so, with respect to the running direction of the horse. When the feet of the driver are located on a level much lower than that of the seat in which the driver is sitting in the sulky, there is a theoretical risk that a horse, should the sulky approach it while the horse is running, could hook its legs into those of the driver. Moving the foot rests rearwardly away from the horse reduces possible strikes from the legs of such a horse against the legs of the driver.

Furthermore, the means comprise a part supporting the seat and the thighs and arranged with the support surface thereof downwardly in the running direction of the horse so as to keep the thighs of a driver sitting in the sulky inclining downwardly in this direction. Such a position is very advantageous and makes it possible to come close to the horse and look thereover should this be needed but nevertheless have the lower leg portions extended in a desired direction.

Additionally, the means are adapted to support the legs of a driver and define a sitting position for the driver with the legs of the driver extending close to each other between the crotch and the feet. Such a position, means as explained above, that the legs of the driver constitutes a considerably smaller surface exposed to the wind than in a conventional driving position.

These means are located on the sulky with respect to the running position of the horse in the sense that it allows a driver sitting in the sulky to move his (her) legs from the supporting means and stand directly on the ground when there is a need thereof, such as because of a horse rearing. Thus, by such configuration of said arrangement, the driver may, starting from in his (her) sitting position, simply place himself on the ground when he or she finds this suitable.

These means specifically comprise a part supporting the seat and the thighs arranged pivotably and adjustably into different fixed position about an axis being substantially horizontal when the sulky rests in the position of use on a substantial horizontal ground, said horizontal axis being substantially perpendicular to the running direction of the horse for changing the inclination of this part. A consequence of such pivotability of this part, it is possible to adapt this part to the size of the driver so that smaller persons may be lifted up to such a position that they may look over the horse should this be needed.

The means, which comprise elements having support surfaces for the feet of the driver to rest upon, are arranged pivotably around an axis oriented substantially horizontally and substantially perpendicular to the running direction of the horse when the sulky is standing in a position of use on a substantially horizontal ground. The driver may, by virtue of such pivotability of these foot rests, get his feet comfortably supported without any tensions in the ankle-joints.

Furthermore, the sulky comprises an element, which is fixedly connected between the shafts of the sulky in the running direction of the horse and in front of the driver received in the sulky so as to protect the driver against possible rear-kicking of the horse. Hence, the driver can assume a sitting position close behind the horse without any risk of being hit by the hind legs of the horse, should the horse kick rearwardly.

Further, the sulky may comprise a spoiler-like apparatus, having surfaces for guiding an airstream, designed to be arranged in front of the driver sitting in the sulky. These surfaces at the front of the spoiler are bent upwardly and rearwardly from the shafts for guiding the airstream above and past the head of the driver sitting behind the apparatus.

The air resistance of the carriage horse, sulky and driver may by the arrangement of such a spoiler-like apparatus be further reduced. The spoiler-like apparatus is then, at least on the level of the head of the driver, preferably made of a transparent material, so that the driver has a good sight also when he is huddling together behind the spoiler-like apparatus.

Further advantages as well as advantageous features of the invention appear from the following description and the other dependent claims.

BRIEF DESCRIPTION OF THE DRAWINGS

With reference to the appended drawings, below follows a description of preferred embodiments of the invention cited as examples.

In the drawings.

BRIEF DESCRIPTION OF PREFERRED EMBODIMENTS OF THE INVENTION

Figure 1:
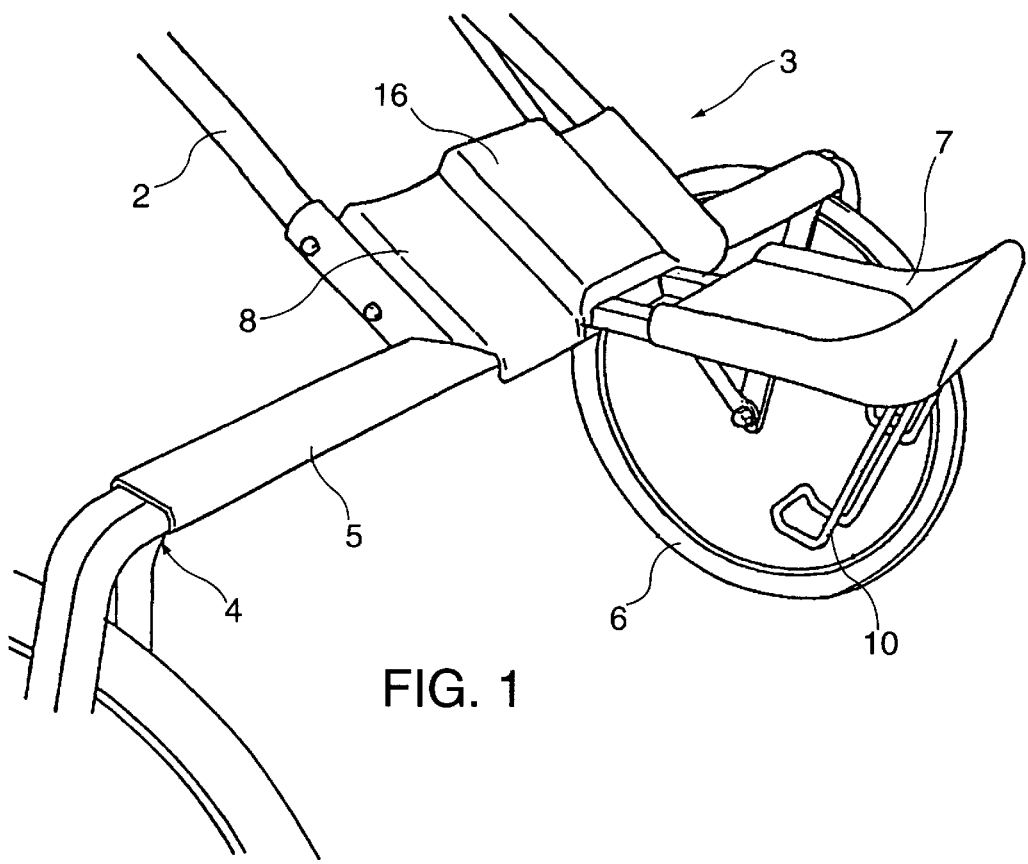
FIG. 1 is a perspective view from behind of a sulky according to a first preferred embodiment of the invention.

A sulky according to a first preferred embodiment of the invention will now be explained while simultaneously referring to FIG. 1 and 2. The sulky has in a conventional way two shafts 2 for connection to a horse (see FIG. 4). The shafts 2 are preferably shaped according to the shape of the horse for receiving a horse therebetween immediately in front of an arrangement 3 adapted to receive the driver in the sulky and which constitutes the most essential part of the present invention. The shafts 2 are connected to a body or framework 4 of the sulky, which has a transversal carrying beam 5 and on which two wheels 6 are rotary journaled. Arrangement 3 is adapted to receive the driver in a sitting position and has for this sake a part 7 supporting the seat and the thighs and which here is formed by a seat and "part supporting the seat and the thighs" means, accordingly, here and in the claims, that it may also be the case that only the seat of the driver rests on the part in question, 10 since also for example a conventional chair has to be considered to support a part of the thighs of a person sitting thereon. The part 7 supporting the seat and the thighs is preferably arranged pivotably about a pivot axis located in the region of the front limitation of the part with respect to the running direction of the horse for adjustment of the inclination thereof between different fixed positions, so that the rear part thereof for example may be pivoted upwardly for a short driver, so that this may look over the horse. It is preferably also displaceable forwardly and rearwardly for adjustment according to the length of the legs of the driver with respect to the members described below for defining the sitting position of the driver.

The sitting arrangement also has support members 8, here in the form of substantially flat cushions located at a small mutual distance with support surfaces adapted to form support for the front side of knee-near portions of the lower leg portions of a driver sitting in the sulky, said support surfaces supporting said lower leg portions being directed with a substantial component of a perpendicular thereto rearwardly opposite to the running direction of the horse, and it appears from the figures that said perpendicular has an angle of approximately 45° to a vertical line, but other angles are also conceivable, in which larger angles result in a better spurn for the driver for drawing strongly in the reins, but the lower leg portions will then instead point more downwardly and closer to the horse. The support members 8 are carried by the beam 5 of the framework and a cross bar 19 arranged between the shafts. A bun-like hill 16 is arranged between the support members 8 for forming lateral supports for the knee-near portions of the body of the driver, which is especially important in changes of the direction, such as when running through curves.

The sitting arrangement 3 comprises also elements having support surfaces for the feet of the driver to rest upon and for keeping them in a defined position. These foot rest elements are arranged pivotably around an axis substantially perpendicular to the running direction of the horse and being substantially horizontal when the sulky stands in the position of use on a substantially horizontal ground while overcoming a resistance rearwardly when forces are applied thereon, which are directed rearwardly with respect to the running direction of the horse. This resistance is in the present case provided by a member in the form of a traction spring 17 for each single foot rest element 10. The spring 17 is adapted to keep the foot rest element in a position (see FIG. 2) pivoted forwardly to a maximum in absence of considerable forces directed rearwardly, said position being defined by a stop member 18. The foot rest elements 10 are also designed to form protections for the lower leg portions of the driver. These elements protect the feet of the driver from being trampled by the horse. These elements receive heels of the driver on support portions 20. Portions 21 of the foot rest elements which extend upwardly such provide protection. The stop member 18 is for this sake also adapted to prevent pivoting of the element 10 forwardly upon influence from a horse coming from behind from occurring. Should considerable forces directed rearwardly be applied on any of the foot rest elements from behind beside the driver, the force of the spring member 17 may be overcome and the element 10 may be moved away rearwardly, so there is no risk that the legs of the driver hook into the legs of the horse. The elements 10 are located substantially directly under the position in which the seat of a driver sitting in the sulky is intended to be located. The elements are adapted to support the two feet of the driver comparatively close to each other. The sitting position in which a driver sitting in a sulky is sitting with substantially bent knees in the sulky and the feet on a substantially lower level than the seat is defined by the sitting arrangement 3. The sitting arrangement is also so adapted that it supports the legs of a driver so that a sitting position is defined for the driver with the legs of the driver extending close to each other between the crotch and the feet. The position of a driver sitting in the sitting arrangement reminds to a great deal of the so called "egg position" assumed by a downhill skier for reducing the air resistance to a minimum. A driver sitting in the sulky according to the invention may in this way huddle together behind the horse, so that when the horse with the sulky and a driver is viewed directly from the front the driver will be substantially completely hidden by the horse and form a wind catch being neglectable with respect to the conventional driving position with diverging legs.

Figure 3:
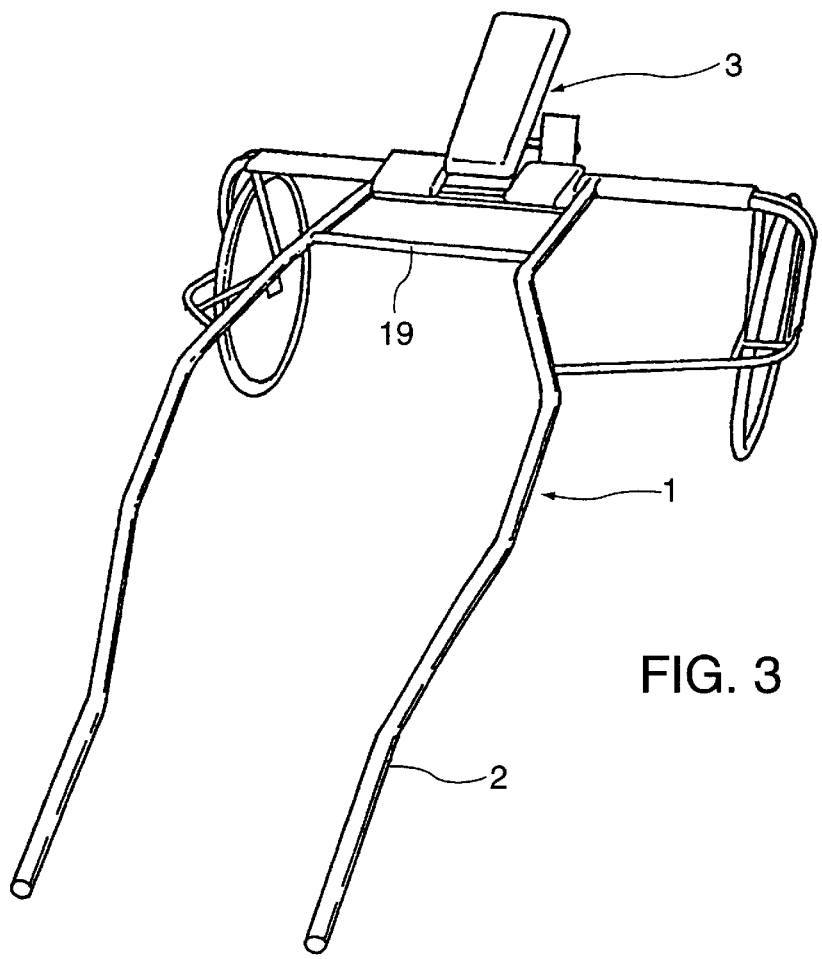
FIG. 3 is a perspective view from the front and obliquely from the top of the sulky according to a second preferred embodiment of the invention.

It gets very easy to get on and off the sulky according to the invention and owing to the fact that no parts of the sulky are in the region between the wheels of the sulky located behind the position the feet of a driver are intended to be located in, the driver may whenever he so wishes frankly just jump down from the sulky and place himself on the ground, which may be of interest when a horse shows tendencies to rearing or is rearing. Would the driver fall off the sulky he will land on his feet and not as previously on his bottom or back and possibly hit the ground with the head. Furthermore, the loads on the back of the driver are reduced considerably in this pleasant driving position with substantially bent knees. By the fact that the support members 8 together with the foot rest elements 10 define a sitting position of the driver with the lower part extending from the knees and rearwardly with respect to the running direction of the horse in a substantial angle with respect to a vertical line through the respective knee, it is also obtained that the driver can sit substantially just as close to the horse as in the conventional sitting position without any risk that the hind legs of the horse may hit the driver during normal running, so that also in this respect the air resistance will not increase. To prevent the horse, located in close proximity to the driver, from striking the driver through a rear-kicking, the sulky as shown in FIG. 3, is provided with an element rigidly connected between the shafts 2. This element is so arranged in the running direction of the horse and in front of a driver sitting in the sulky such that the feet of the horse, should the horse rear kick, will hit this element and not reach the driver.

Figure 2:
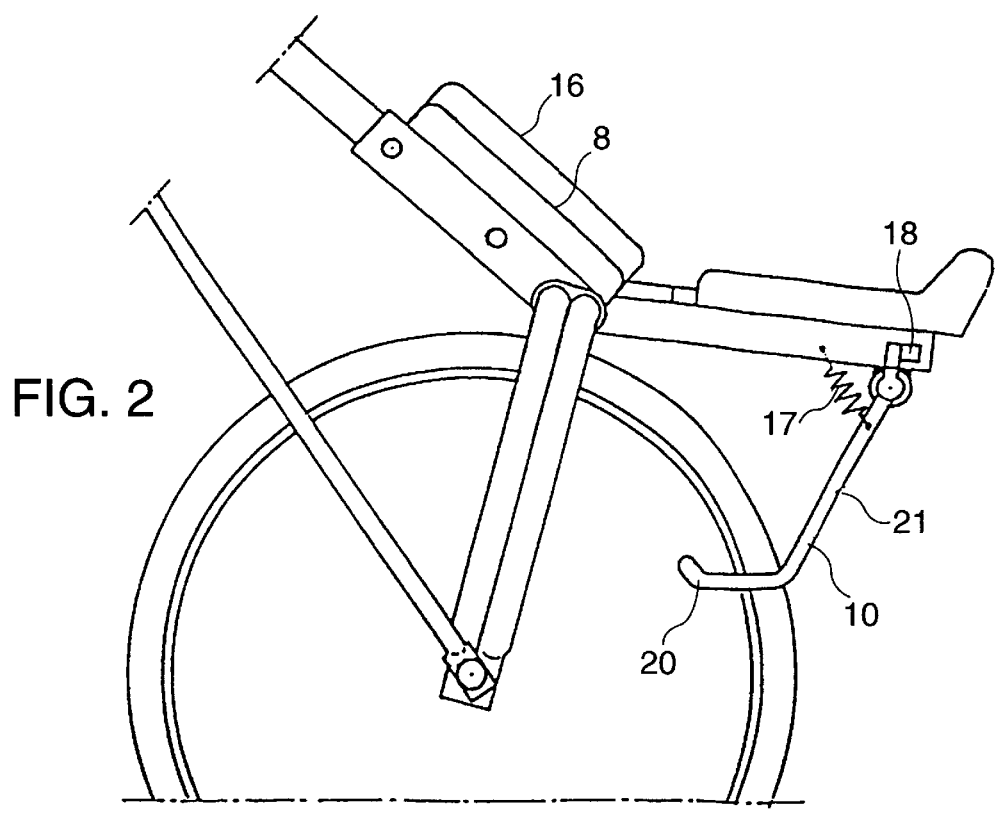
FIG. 2 is a side-elevation view of the sitting arrangement of the sulky according to FIG. 1.
Figure 4:
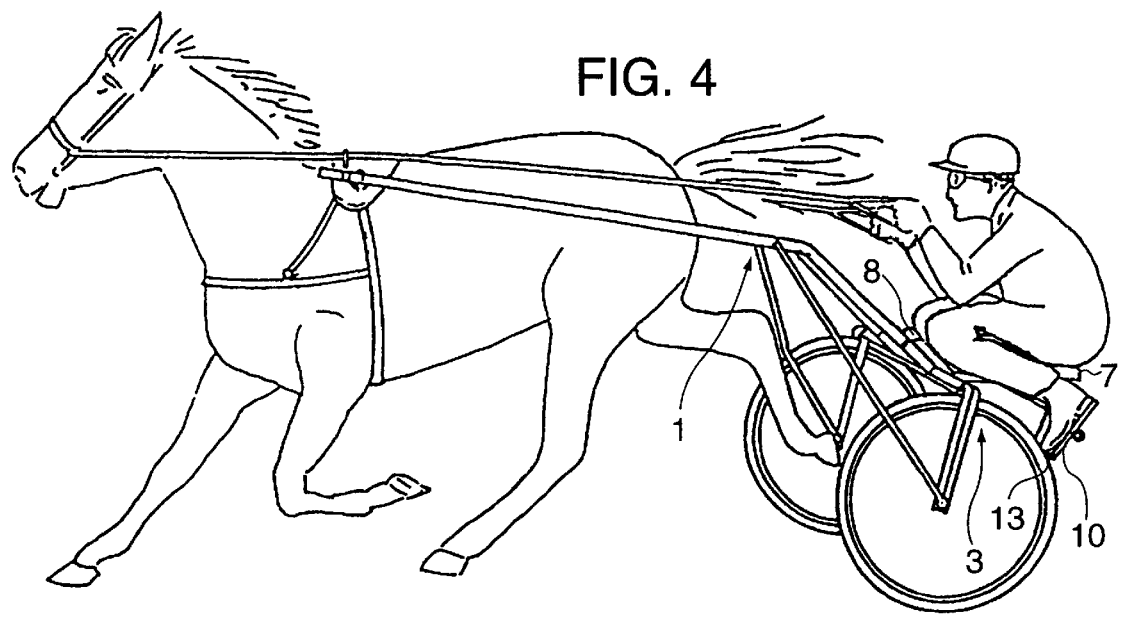
FIG. 4 is a perspective side view of the sulky according to FIG. 3 connected to a horse.
Figure 5:
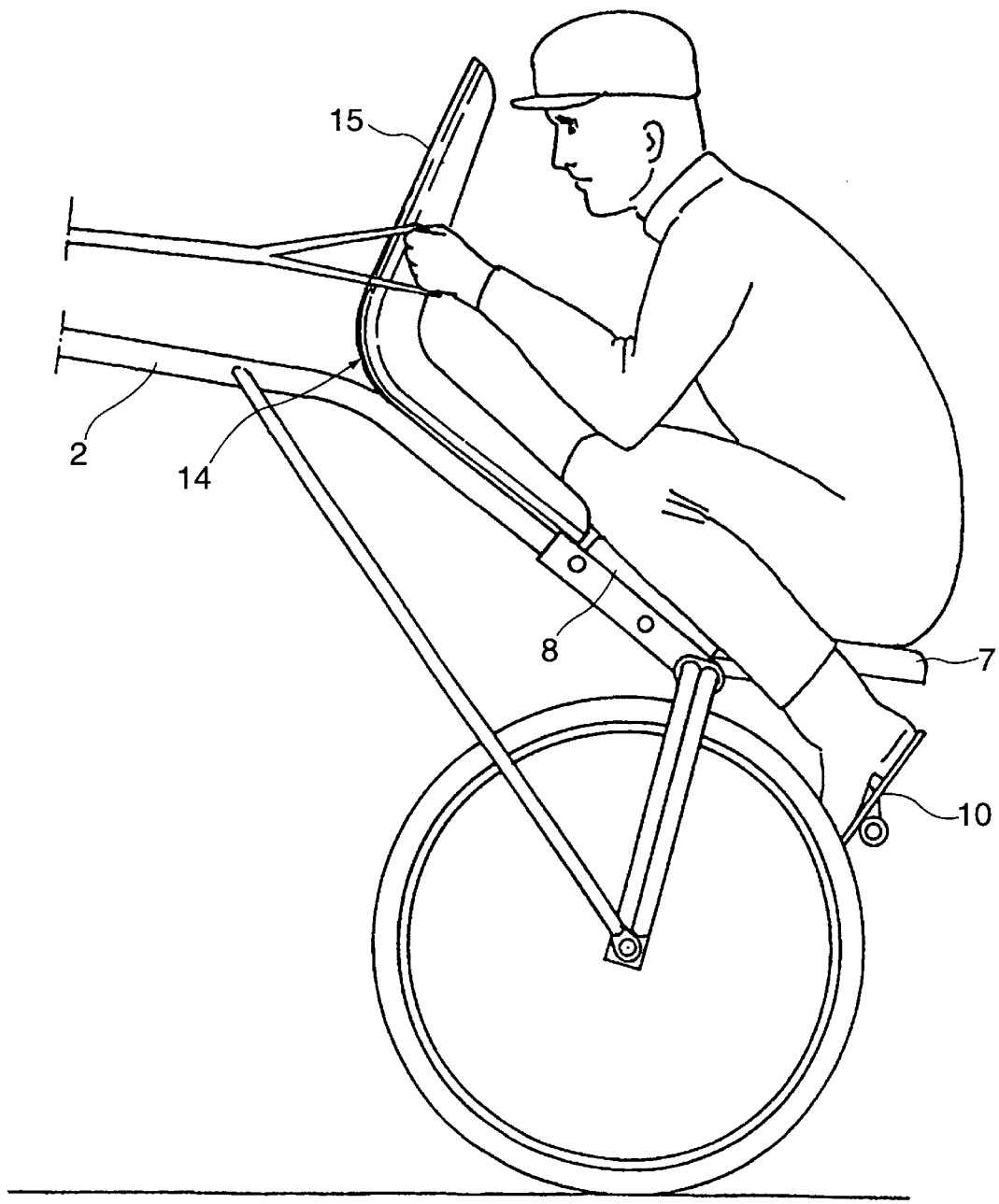
FIG. 5 is a side-elevation view of the sitting arrangement of a sulky according to a third preferred embodiment of the invention with a driver received therein.

The embodiment is illustrated in FIG. 3, 4 and 5 differs from the embodiment illustrated in FIG. 1 and 2 primarily by the fact that the bun-like hill 16 is not present and that the element 10 for supporting the feet of the driver are designed differently. More exactly, the foot rest elements 10 are arranged to be displaceable with respect to the rest of the arrangement through a telescopic device (not shown) for adapting the position of the elements to the length of the lower leg portions of the driver sitting in the sulky. The telescopic-like member may in the telescopic device be locked into different fixed positions. The direction of the holder holding the foot rest elements 10 is so that the support surfaces of the support members 8 will define the angle of the lower leg portions of the driver. The foot rest elements have portions 13 supporting the toes for preventing sliding of the feet of the driver off from the elements 10.

Furthermore, a sulky according to a third preferred embodiment of the invention is schematically illustrated in FIG. 5 and this differs from the sulky shown in FIG. 3 and 4 by the arrangement of a spoiler-like apparatus 14 with airstream guiding surfaces in front of the sulky between the shafts and these surfaces are designed to cover the space between the shafts at the rear end thereof with respect to the running direction of the horse in front of a driver sitting in the sulky. These surfaces are bent upwardly in the front of the spoiler and rearwardly from the shafts so as to guide an airstream above and past the head of a driver sitting behind the apparatus. The driver should from the position in FIG. 5 lean forwardly-downwardly for obtaining this. However, it would be completely possible to modify the spoiler-like apparatus so that the portions 15 bent upwardly gets an extension being substantially more directed rearwardly. The part of the air resistance of the carriage emanating from the driver may by arranging such a spoiler-like apparatus be further reduced.

Preferably, at least the surfaces of the apparatus located in front of the face of the driver and forward of a transparent material.

The invention is of course not in any way restricted to the preferred embodiments described above, but many possibilities to modifications thereof would be apparent to a man skilled in the art in this field without departing from the basic idea of the invention.

It would for example be possible in the existence of a spoiler-like apparatus discussed above to prolong this further downwardly towards the foot position of the driver so as to guide all the speed wind past the driver.

The different angles of the thighs and the lower leg portions of the driver may as already mentioned vary quite a lot within the scope of the invention. The different parts included in the sitting arrangement could also be modified a great deal with respect to the design thereof without changing the basic function thereof for this sake.

The part supporting the seat and the thighs could have another appearance and be substantially seat supporting and allow the thighs of the driver to be moved together, in which the members supporting the lower leg portions and/or the foot rest elements may then offer substantially continuous support surfaces for both lower leg portions and the feet, respectively.

With respect to the pivotability of the foot rest elements this is also intended to comprise the pivotability thereof by pivoting the holder 12 with, respect to said framework close to the front end thereof.

The foot rest elements could be moved away rearwardly in another way than through pivoting, but they could also be fixedly arranged.

It would also be possible to modify the sulky so that the spoiler-like apparatus also extends downwardly around the legs of the driver and the driver could then sit inside a trough-like construction.

What is claimed is:

1. A sulky adapted to be connected to and drawn by a horse, the sulky comprising:

an arrangement having a seat and adapted to receive a driver in a sitting position with feet of the driver located at a substantially lower level than the seat and further comprises supporting means arranged to support at least legs of the driver in said position; and wherein said supporting means comprises members having support surfaces adapted to form a support for a front side of at least parts of the legs and also permit the driver to draw reins of the horse in a rearwardly direction, said support surfaces supporting at least a front side of at least proximal knee portions of lower leg portions of the driver and in a direction substantially rearward and opposite to a running direction of the horse.

2. A sulky according to claim 1, wherein the support surfaces are arranged proximate to rear ends of shafts of the sulky with respect to the running direction.

3. A sulky according to claim 2, wherein the support surfaces are carried by a part of a framework of the sulky, a rear end of the part connecting the shafts to each other and to a remainder of the framework.

4. A sulky adapted to be connected to and drawn by a horse, the sulky comprising:

an arrangement having a seat and adapted to receive a driver in a sitting position with feet of the driver located at a substantially lower level than the seat and further comprises supporting means arranged to support a front of at least parts of legs of the driver in said position; and wherein said supporting means further comprise supporting members which are adapted for receiving a driver in a sitting position and form a support for and define a sitting position of the driver such that lower leg portions of the driver are adapted to extend both from knees of the driver rearwardly with respect to a running direction of the horse and at an angle with respect to a vertical line through each respective knee.

5. A sulky according to claim 4 wherein the supporting members are adapted to form a support for defining a sitting position where the feet of the driver are located substantially directly under the seat.

6. A sulky according to claim 4, wherein the supporting members comprises elements adapted to receive the feet of the driver sitting in the sulky and keep the feet in a defined position.

7. A sulky according to claim 6 further comprising members adapted to arrange said elements, such that the driver can remove the feet therefrom in a rearward direction with respect to the running direction.

8. A sulky adapted to be connected to and drawn by a horse, the sulky comprising:

an arrangement having a seat and adapted to receive a driver in a sitting position with feet of the driver located at a substantially lower level than the seat and further comprises supporting means arranged to support a front of at least parts of legs of the driver in said position; and a spoiler-like apparatus, connected to the arrangement, having surfaces for guiding an airstream above and past a head of the driver, the spoiler being situated in front of the driver and the surfaces being oriented upwardly and rearwardly away from the sulky.

9. A sulky adapted to be connected to and drawn by a horse, the sulky comprising:

an arrangement having a seat and adapted to receive a driver in a sitting position with feet of the driver located at a substantially lower level than the seat and further comprising:

supporting means arranged to support at least legs of the driver in said position; and members adapted to form lateral supports for inner sides of knee-portions of the legs of the driver, the members projecting upwardly between the legs of the driver sitting in the sulky.

* * * * *